(12) United States Patent
Kim

(10) Patent No.: US 7,101,600 B1
(45) Date of Patent: Sep. 5, 2006

(54) PERPENDICULAR MAGNETIC RECORDING DISK

(75) Inventor: Jai-young Kim, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/029,961

(22) Filed: Dec. 31, 2001

(30) Foreign Application Priority Data

Dec. 29, 2000 (KR) ......................................... 2000-86269

(51) Int. Cl.
  *G11B 5/66* (2006.01)

(52) U.S. Cl. ............................... 428/65.3; 428/694 TM; 428/694 TS; 428/343; 428/216; 428/336; 428/668

(58) Field of Classification Search ................ 428/64.3, 428/64.4, 64.6, 64.9, 65.3, 65.5, 611, 336, 428/693, 694 R, 694 MM, 694 T, 694 TS, 428/900, 694 TP, 694 TM, 343, 216, 668, 428/694 S, 694 ST, 694 BP, 694 BM; 427/131; 360/313, 327.2, 327.22, 327.23, 327.3; 204/192.15, 204/192.2
See application file for complete search history.

(56) References Cited

U.S. PATENT DOCUMENTS

| | | | | |
|---|---|---|---|---|
| 4,632,883 A | * | 12/1986 | Howard et al. | 428/694 ST |
| 5,576,085 A | * | 11/1996 | Lal et al. | 428/694 T |
| 5,589,262 A | * | 12/1996 | Kiuchi et al. | 428/336 |
| 5,616,218 A | * | 4/1997 | Alex | 204/192.2 |
| 5,922,456 A | * | 7/1999 | Tanahashi et al. | 428/694 R |
| 5,942,342 A | * | 8/1999 | Hikosaka et al. | 428/694 R |
| 6,248,416 B1 | * | 6/2001 | Lambeth et al. | 428/65.3 |
| 6,475,611 B1 | * | 11/2002 | Chen | 428/694 TM |
| 6,641,934 B1 | * | 11/2003 | Suzuki et al. | 428/694 TS |
| 2001/0019786 A1 | * | 9/2001 | Ikeda | 428/694 TM |
| 2002/0055020 A1 | * | 5/2002 | Futamoto et al. | 428/694 TS |

FOREIGN PATENT DOCUMENTS

| | | |
|---|---|---|
| EP | 461834 A1 | 12/1991 |
| EP | 0461834 A2 * | 12/1991 |
| JP | 10320741 | 12/1998 |
| JP | 11185237 | 7/1999 |
| JP | 11232633 | 8/1999 |
| JP | 11250435 | 9/1999 |
| JP | 200207721 | 7/2000 |
| JP | 2000-222715 A | 8/2000 |
| JP | 200276727 | 10/2000 |
| JP | 200311326 | 11/2000 |

OTHER PUBLICATIONS

Wang et al Effects of Thin Cr IEEE Transactions on Magnetics vol. 34, No. 4 Jul. 1998.*

Notification of the First Office Action issued by the Chinese Patent Office on Mar. 12, 2004 in corresponding Chinese application 01130278.X.

Honda et al (Extremely High Linear Density Recording by Perpendicular Magnetization –IEEE Trans. On Magnetics vol. 32 No 5 Sep. 1996 pp. 3804–3806).*

(Continued)

*Primary Examiner*—Carol Chaney
*Assistant Examiner*—Louis Falasco
(74) *Attorney, Agent, or Firm*—Buchanan Ingersoll PC (57) ABSTRACT

A perpendicular magnetic recording disk is provided. The perpendicular magnetic recording disk includes an underlayer between a substrate and a perpendicular magnetic recording layer for inducing perpendicular orientation of the perpendicular magnetic recording layer, the perpendicular magnetic recording layer having a thickness in the range where the ratio of perpendicular coercivity Hc to maximum perpendicular coercivity Ho decreases with reduced thickness of the perpendicular magnetic recording layer.

8 Claims, 8 Drawing Sheets

OTHER PUBLICATIONS

Ullmann's Encyclopedia of Industrial Chemistry "Magnetic Quantities and Their Measurement" Jun. 15, 2000.*
Translation JP 10320741.*
Translation JP 11185237.*
Translation JP 1232633.*
Translation JP 2000207721.*
Translation JP 2000311326.*
Translation Jp 2000276727.*
Translation JP 2003036525.
Translation JP 11250435.

* cited by examiner

PERPENDICULAR MAGNETIC RECORDING DISK

Priority is claimed to Patent Application Number 2000-86269, filed in the Republic of Korea on Dec. 29, 2000, herein incorporated by reference.

BACKGROUND OF THE INVENTION

1. Field of the Invention

The present invention relates to magnetic recording disks, and more particularly, to single-layer and pseudo double-layer perpendicular magnetic recording disks with micro-sized domains.

2. Description of the Related Art

In longitudinal magnetic recording (LMR) applied to hard disk drives (HDDs), a major external data storage device of computers, the size of a data record domain in a magnetic disk has decreased with microstructure as the need for high-density data recording increases. However, this decrease in size makes the data record domains susceptible to removal by thermal energy generated by operation of the HDD which is more dominant than magnetostatic energy from the data record domain. This is referred to as the super paramagnetic effect. To overcome the super paramagnetic effect, the LMR technique has been replaced by a perpendicular magnetic recording (PMR) technique for HDD applications. The PMR technique uses a higher electrostatic energy and lower demagnetization energy compared to the LMR technique, so it is advantageous in high-density data recording. The high-density PMR technique also has enabled detection of a micro data domain in combination with advances in the manufacture of highly sensitive read heads.

In the PMR technique suitable for high-density magnetic recording, perpendicular magnetic anisotropy energy is exerted to orient the direction of magnetized domains perpendicular to the plane of a magnetic disk. Thus, head fields from a magnetic head should be induced to be perpendicular to the magnetic disk plane and thus parallel to the magnetized domains. To achieve this, a single-pole-type (SPT) perpendicular magnetic head is required. However, the SPT perpendicular magnetic head also generates a demagnetization field stronger than the perpendicular field of the magnetic head, so the perpendicular magnetic field induced by the SPT head is insufficient for recording, thus limiting use of the perpendicular magnetic recording technique in HDD applications.

The recent advances in magnetic recording technologies have enabled PMR with a ring-type magnetic head that has been used widely in LMP due to its ability to apply enhanced perpendicular magnetic fields for recording. Based on the PMR performed using the ring-type magnetic head, a single-layer PMR disk with a perpendicular magnetic recording/playback layer has been developed.

Figure 1:
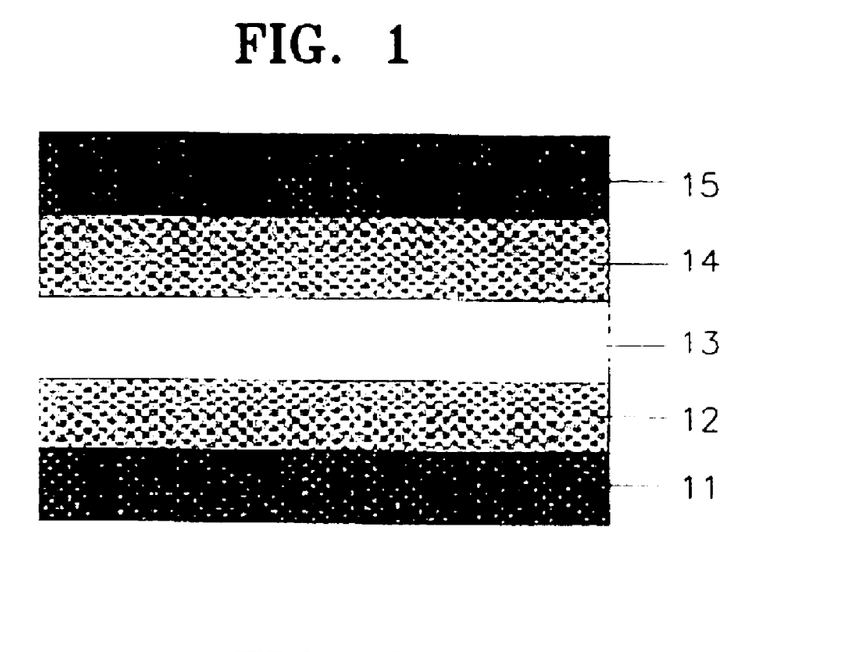
FIG. 1 is a sectional view showing the structure of a single-layer perpendicular magnetic recording (PMR) disk.

The schematic structure of a single-layer PMR disk is shown in FIG. 1. The single-layer PMR disk includes an underlayer 12 for promoting the perpendicular orientation of a perpendicular magnetic recording layer 13 formed over the underlayer 12, the perpendicular magnetic recording layer 13 having the perpendicular magnetic anisotropy energy to keep the perpendicular orientation of the data record domain, a protective layer 14 for protecting the perpendicular magnetic recording layer 13 from external impacts, and a lubricant layer 15.

The perpendicular magnetic recording layer 13 has the perpendicular magnetic anisotropy energy with a magnetic easy axis oriented perpendicular to the plane of the perpendicular magnetic recording layer 13 due to the underlayer 12. Therefore, perpendicular data recording can be achieved by perpendicular magnetic field components from a ring-type head. However, in the conventional single-layer PMR disk shown in FIG. 1, the perpendicular magnetic recording layer 13 having the perpendicular magnetic anisotropy energy has also a large demagnetization factor and thus strong demagnetization energy is induced in a direction opposite to the magnetic moment of the perpendicular magnetic recording layer 13, as expressed by formula (1) below:

$$Ku_{eff} = Ku - 2\pi NdMs^2 \quad (1)$$

where $Ku_{eff}$ is the effective perpendicular magnetic anisotropy energy, $Ku$ is the perpendicular magnetic anisotropy energy, $Nd$ is the demagnetization factor, $Ms$ is the saturation magnetization, and $2\pi NdMs^2$ is the demagnetization energy.

Thus, the effective perpendicular magnetic anisotropy energy of the perpendicular magnetic recording layer 13 is abruptly decreased with unsatisfactory high-density recording properties, thereby limiting HDD applications of the perpendicular magnetic recording technique.

To overcome the effective perpendicular magnetic anisotropy energy reduction occurring in such a single-layer PMR disk, a pseudo double-layer PMR disk capable of reducing the demagnetization energy of its perpendicular magnetic recording layer has been developed.

Figure 2:
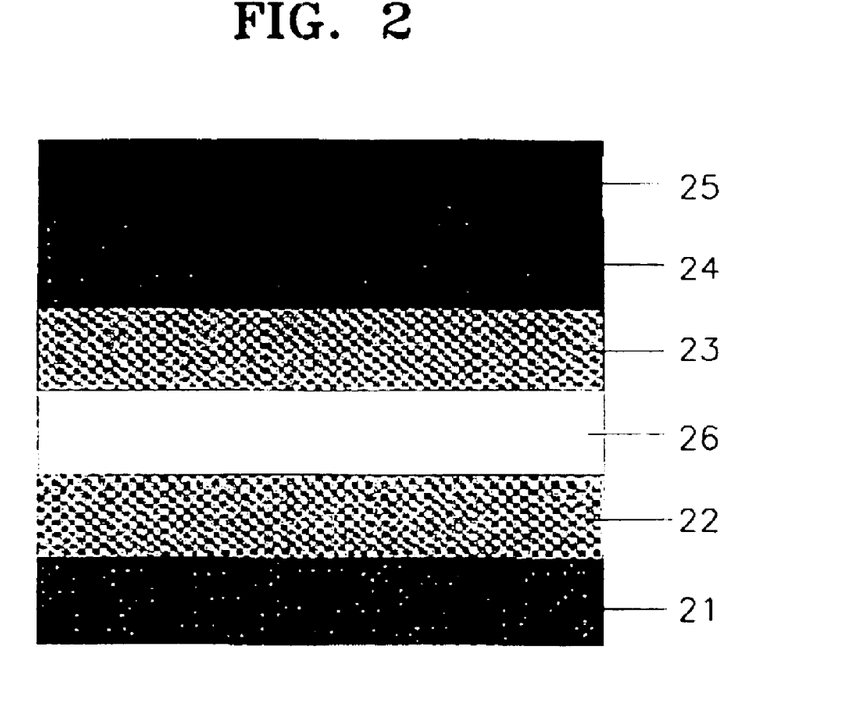
FIG. 2 is a sectional view showing the structure of a pseudo double-layer PMR disk with an intermediate soft magnetic layer.

In the pseudo double-layer PMR disk, as shown in FIG. 2, an intermediate soft magnetic layer 26 is deposited between a perpendicular orientation promoting underlayer 22 and a perpendicular magnetic recording layer 23 to allow formation of a closed magnetic circuit through the perpendicular magnetic recording layer 23 by perpendicular magnetic field components from a ring-type head. The closed magnetic circuit formed by the intermediate soft magnetic layer 26 reduces the demagnetization factor of the perpendicular magnetic recording layer 23 and its demagnetization energy, and thereby limits reduction in the effective perpendicular magnetic anisotropy energy.

Figure 3:
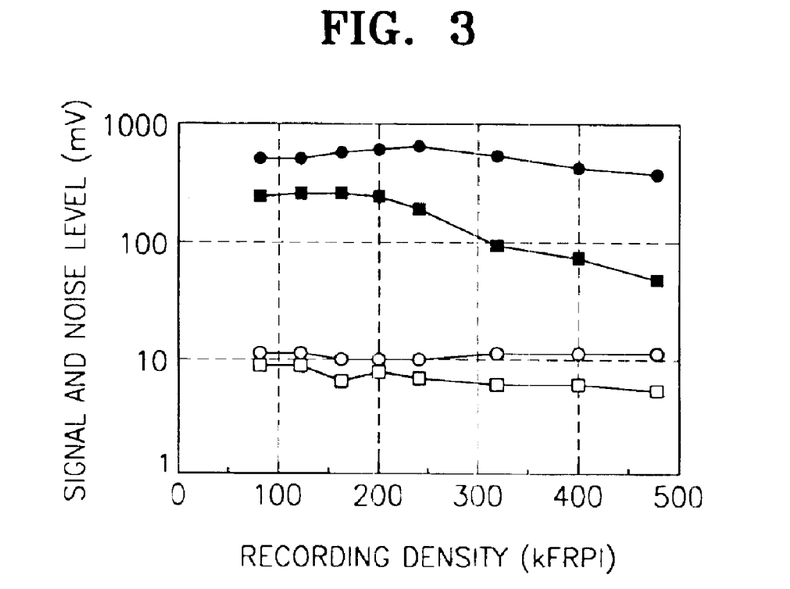
FIG. 3 is a graph showing signal and noise level variations with respect to recording densities in kFRPI (kilo flux revolutions per inch) for the single-layer PMR disk and the pseudo double-layer PMR disk.

FIG. 3 is a graph showing signal and noise level variations with respect to recording densities in kFRPI (kilo flux revolutions per inch) for the signal-layer PMR disk shown in FIG. 1 and the pseudo double-layer PMR disk with the intermediate soft magnetic layer shown in FIG. 2. In FIG. 3, -■- and -□- represent the signal and noise levels, respectively, of the single-layer PMR disk, and -●- and -○- represent the signal and noise levels, respectively, of the pseudo double-layer PMR disk.

The pseudo double-layer PMR disk shows a higher signal output than the single-layer PMR disk due to retention of the effective perpendicular magnetic anisotropy energy by the intermediate soft magnetic layer 26 that reduces the demagnetization energy by forming a closed magnetic circuit through the perpendicular magnetic recording layer 23. However, the intermediate soft magnetic layer 26 is also likely to cause a random orientation of neighboring magnetic fields and results in additional noise (jitter), so the pseudo double-layer PMR disk has a higher noise level than the single-layer PMR disk. Due to increases in both the signal and noise levels, the pseudo double-layer PMR disk has a signal-to-noise ratio which is too small for high-density recording. Therefore, there is a need to reduce a noise output level originating from the perpendicular magnetic recording layer 23 of the pseudo double-layer PMR disk to obtain a SNR large enough for high-density recording.

Reducing a noise level is also advantageous to the signal-layer PMR disk for improved SNR. For this reason, there have been continuing efforts to reduce a noise level amplified by the perpendicular magnetic recording layer itself in the single-layer and pseudo double-layer PMR disks for improved SNR.

SUMMARY OF THE INVENTION

To solve the above-described problems, it is an objective of the present invention to provide a perpendicular magnetic recording (PMR) disk with a single-layered structure or a pseudo double-layered structure including an intermediate soft magnetic layer to reduce the demagnetization energy of a perpendicular magnetic recording layer, in which amplification of a noise level occurring together with signal level increase is reduced with a stable signal-to-noise ratio (SNR) from magnetic domains.

To achieve the objective of the present invention, there is provided a perpendicular magnetic recording disk including an underlayer between a substrate and a perpendicular magnetic recording layer for inducing perpendicular orientation of the perpendicular magnetic recording layer, the perpendicular magnetic recording layer having a thickness in the range where the ratio of perpendicular coercivity Hc to maximum perpendicular coercivity Ho decreases with reduced thickness of the perpendicular magnetic recording layer.

Preferably, the perpendicular magnetic recording disk is applied to a pseudo double-layer structure including an intermediate soft magnetic layer between the underlayer and the perpendicular magnetic recording layer for forming closed magnetic loops together with the perpendicular magnetic recording layer.

Preferably, in the range of thickness of the perpendicular magnetic recording layer, the rate of variation of the ratio of perpendicular remanent magnetization to maximum perpendicular remanent magnetization is greater than that of the ratio of perpendicular coercivity Hc to maximum perpendicular coercivity Ho.

Preferably, in the range of thickness of the perpendicular magnetic recording layer, a noise level constant of proportionality a expressed as the following formula decreases with reduced thickness of the perpendicular magnetic recording layer:

$$\alpha = \frac{4\pi Mr}{Hc}$$

where Mr is the perpendicular remanent magnetization and Hc is the perpendicular coercivity.

It is preferable that the perpendicular magnetic recording layer is formed of a CoCr alloy. It is preferable that the perpendicular magnetic recording layer further comprises at least one material selected from the group consisting of B, Pt, Ta, V, Nb, Zr, Y, and Mo. It is preferable that the perpendicular magnetic recording layer has a thickness of 20–50 nm.

It is preferable that the intermediate soft magnetic layer is formed of a NiFe alloy. Preferably, the intermediate soft magnetic layer further comprises at least one material selected from the group consisting of Nb, V, Ta, Zr, Hf, Ti, B, Si, and P. Preferably, the intermediate soft magnetic layer has a thickness of 3–30 nm.

It is preferable that the perpendicular magnetic recording disk further comprises a protective layer and a lubricant layer sequentially on the perpendicular magnetic recording layer.

The PMR according to the present invention is compatible with a ring-type magnetic record head and a magneto-resistive (MR) read head.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

In increasing the signal-to-noise ratio (SNR) of a single-layer or pseudo double-layer perpendicular magnetic recording (PMR) disk, a noise level should be reduced while keeping a signal level of a PMR layer constant. Noise levels are proportional to a noise level constant a which is proportional to the average diameter of reversed magnetic domains formed in the magnetic recording layer, as expressed by formula (2) below:

$$\alpha = \frac{4\pi Mr}{Hc} \quad (2)$$

where Mr is the perpendicular remanent magnetization and Hc is the perpendicular coercivity. Therefore, there is a need to reduce the diameter of magnetic domains in the magnetic recording layer to reduce the noise level.

The domain diameter in the magnetic recording layer is dependent on the balance between the magnetostatic energy and domain wall energy. In particular, to lower the magnetostatic energy, there is a need to divide domains in the magnetic recording layer into a number of micro-domains to form closed magnetic loops. However, the domain wall energy is increased due to the increased number of micro-domains, thereby increasing the total energy level of the PMR layer. The sum of electrostatic energy and domain wall energy and the domain diameter have the following relationship:

$$E_{tot} = E_{ms} + E_{wall} = 1.7 \, Ms^2 D + \gamma L/D \quad (3)$$

where $E_{tot}$ is the total energy of the PMR layer, $E_{ms}$ is the electrostatic energy of the PMR layer equivalent to $1.7 Ms^2 D$, $E_{wall}$ is the domain wall energy of the PMR layer equivalent to $\gamma L/D$, Ms is the saturation magnetization, D is the domain diameter, y is the domain wall energy, and L is the thickness of the PMR layer.

To minimize the total energy of the PMR layer, i.e., the sum of the electrostatic energy and domain wall energy, expressed as formula (3) above, the domain diameter D is determined based on formula (4) below:

$$D = \sqrt{\frac{\gamma L}{1.7 Ms^2}}. \quad (4)$$

As is apparent from formula (4) above, the thickness L of the PMR layer in a single-layer or pseudo double-layer PMR disk can be decreased to reduce the domain diameter D in the PMR layer and thereby to lower noise levels.

Figure 4:
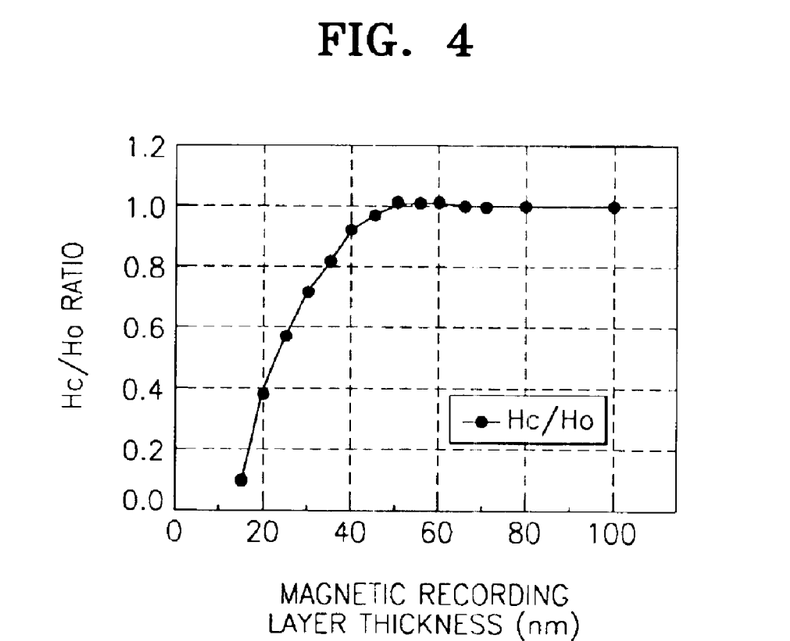
FIG. 4 is a graph showing variations in perpendicular coercivity Hc with respect to variations in thickness of a PMR layer.

In manufacturing a conventional PMR disk, to reduce a noise level of its PMR layer, the thickness of the PMR layer is determined to be a point at which the perpendicular coercivity Hc has a maximum value, thereby resulting in a minimal value of the noise level constant of proportionality a expressed as formula (2) above. As an example, for a CoCr alloy magnetic recording layer of a conventional PMR disk, the perpendicular coercivity Hc is abruptly decreased at a recording layer thickness no greater than 50 nm, as shown in FIG. 4, which shows the ratio of perpendicular coercivity Hc to maximum perpendicular coercivity Ho with respect to thickness variations. Thus, the CoCr alloy magnetic recording layer is formed to be thicker than 50 nm in the conventional PMR disk for noise level control.

Figure 5:
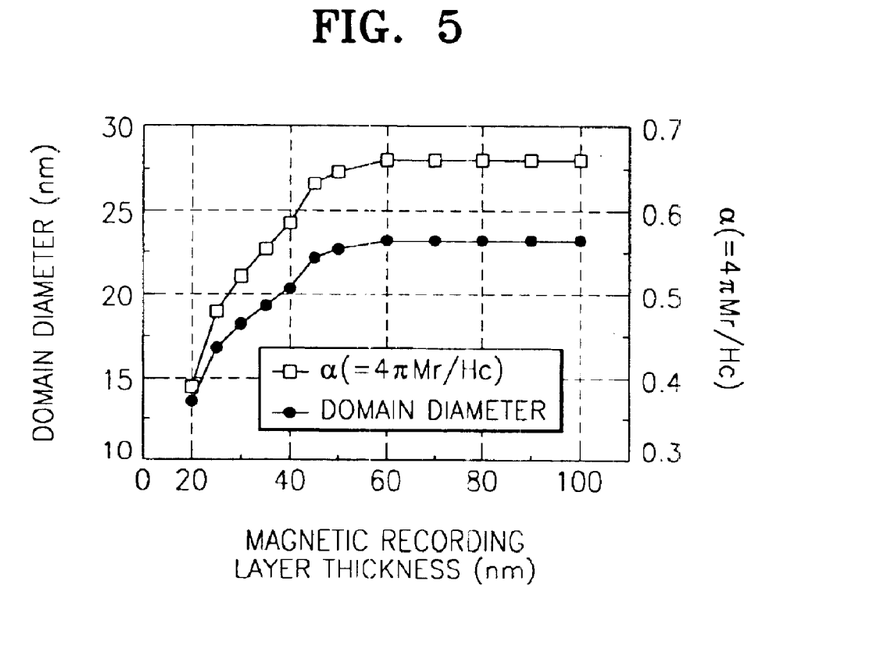
FIG. 5 is a graph showing variations in domain diameter and proportional noise level constant a with respect to variations in thickness of the PMR layer.

However, a high-coercivity magnetic recording layer as thick as 50 nm or greater is not enough to reduce the noise level constant of proportionality α, as shown in FIG. 5, for a pseudo double-layer PMR disk. Also, there occur additional noises (jitter) in the pseudo double-layer PMR disk due to the use of the intermediate soft magnetic layer, thereby resulting in a high noise level. Accordingly, the SNR is poor.

FIG. 5 shows the variations in domain diameter with respect to variations in thickness of a CoCr alloy magnetic recording layer in a pseudo double-layer PMR disk. As shown in FIG. 5, decreases in domain diameter are observed at a magnetic recording layer thickness smaller than the thickness at which the perpendicular coercivity Hc starts to decrease. Apparently, micro-domains can be formed at a reduced thickness of the magnetic recording layer. Also, the formation of micro-domains in the magnetic recording layer can induce a sharp reduction of the noise level constant of proportionality a, as shown in FIG. 5.

Figure 6:
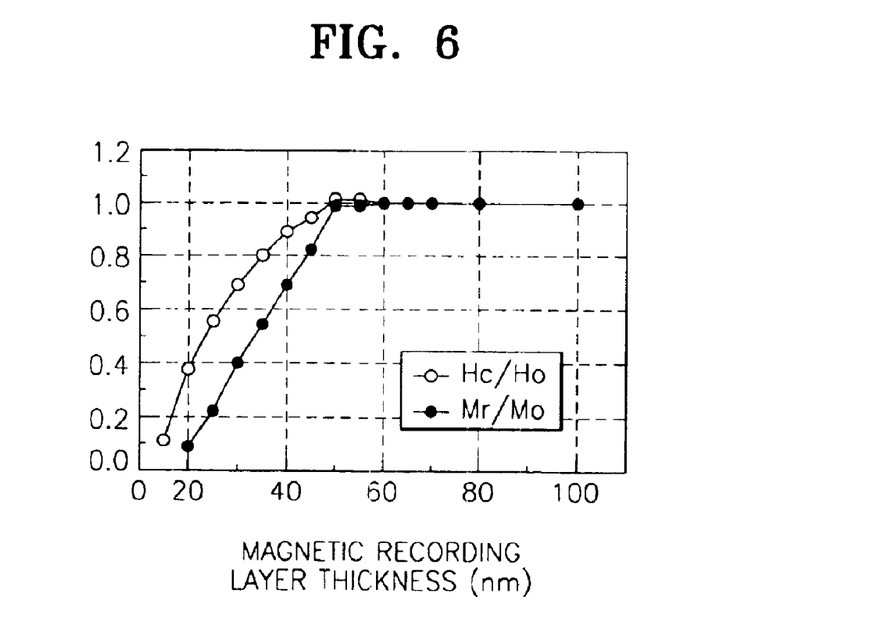
FIG. 6 is a graph showing variations in perpendicular coercivity ratio Hc/Ho and the perpendicular remanent magnetization ratio Mr/Mo with respect to variations in thickness of the PMR layer.

FIG. 6 is a graph showing the variations in perpendicular coercivity ratio (Hc/Ho) and perpendicular remanent magnetization ratio (Mr/Mo) with respect to variations in thickness of the CoCr alloy magnetic recording layer in a pseudo double-layer PMR disk. In FIG. 6, Hc represents the perpendicular coercivity, Ho represents the maximum perpendicular coercivity, Mr represents the perpendicular remanent magnetization, and Mo represents the maximum perpendicular remanent magnetization.

As shown in FIG. 6, the perpendicular remanent magnetization ratio (Mr/Mo) shows a sharp reduction with respect to variations in thickness of the CoCr alloy magnetic recording layer, compared to the perpendicular coercivity ratio (Hc/Ho). This sharp reduction in the perpendicular remanent magnetization ratio (Mr/Mo) with reduced thickness of the magnetic recording layer, which is due to the formation of micro-domains, reduces the noise level constant of proportionality a.

In a pseudo double-layer PMR disk according to the present invention, the thickness of a CoCr alloy magnetic recording layer is reduced to a thickness at which the perpendicular coercivity decreases, and micro-domains are formed in the CoCr alloy magnetic recording layer, thereby lowering noise levels with improved SNR. The inventors of the present invention also have experimentally found the same effect in a single-layer PMR disk.

According to a preferred embodiment of the present invention, a pseudo double-layer PMR disk may be manufactured as follows. An underlayer that induces the perpendicular orientation of a PMR layer is formed to a thickness of 50–100 nm on a glass or aluminium (Al) alloy substrate by vacuum deposition, an intermediate soft magnetic layer is formed on the underlayer to a thickness of 3–30 nm, and then the PMR layer is formed thereon to a thickness of 20–50 nm. Next, a protective layer and a lubricant layer are sequentially formed on the PMR layer.

A single-layer PMR disk can be manufactured in the same manner as above for the pseudo double-layer PMR disk, except that the intermediate soft magnetic layer is not formed.

Suitable materials for the underlayer for promoting the perpendicular orientation of the PMR layer include a titanium (Ti) alloy, a non-magnetic cobalt (Co) alloy, a platinum (Pt) alloy, and a palladium (Pd) alloy, but a Ti alloy is preferred.

In the present invention, the protective layer and the lubricant layer can be formed of any material to an arbitrary thickness within a predetermined range for normal deposition in the field without limitations.

The present invention will be described in greater detail by means of the following examples. The following examples are for illustrative purposes and are not intended to limit the scope of the invention.

EXAMPLE 1

A Ti underlayer was deposited to a thickness of 50 nm on a glass substrate having a 650-nm thickness. A CoCr alloy PMR layer was formed on the Ti underlayer to a thickness of 35 nm, a carbon-based layer acting as a protective layer was formed thereon to a thickness of 10 nm, and a lubricant layer was formed thereon to a thickness of 2 nm, thereby resulting in a single-layer PMR disk.

EXAMPLE 2

A single-layer PMR disk was manufactured in the same manner as in Example 1 except that the thickness of the PMR layer was 20 nm.

EXAMPLE 3

A Ti underlayer was deposited to a thickness of 50 nm on a glass substrate having a 650-nm thickness. An intermediate NiFe alloy soft magnetic layer was formed thereon to a thickness of 20 nm, and a CoCr alloy magnetic recording layer was formed as a PMR layer thereon to a thickness of 35 nm. Next, a carbon-based layer acting as a protective layer was formed thereon to a thickness of 10 nm, and a lubricant layer was formed thereon to a thickness of 2 nm, thereby resulting in a pseudo double-layer PMR disk.

EXAMPLE 4

A pseudo double-layer PMR disk was manufactured in the same manner as in Example 3 except that the thickness of the PMR layer was 20 nm.

COMPARATIVE EXAMPLE 1

A single-layer PMR disk was manufactured in the same manner as in Example 1 except that the thickness of the CoCr alloy magnetic recording layer as a PMR layer was 50 nm.

COMPARATIVE EXAMPLE 2

A pseudo double-layer PMR disk was manufactured in the same manner as in Example 3 except that the thickness of the CoCr alloy magnetic recording layer as a PMR layer was 50 nm.

Figure 7:
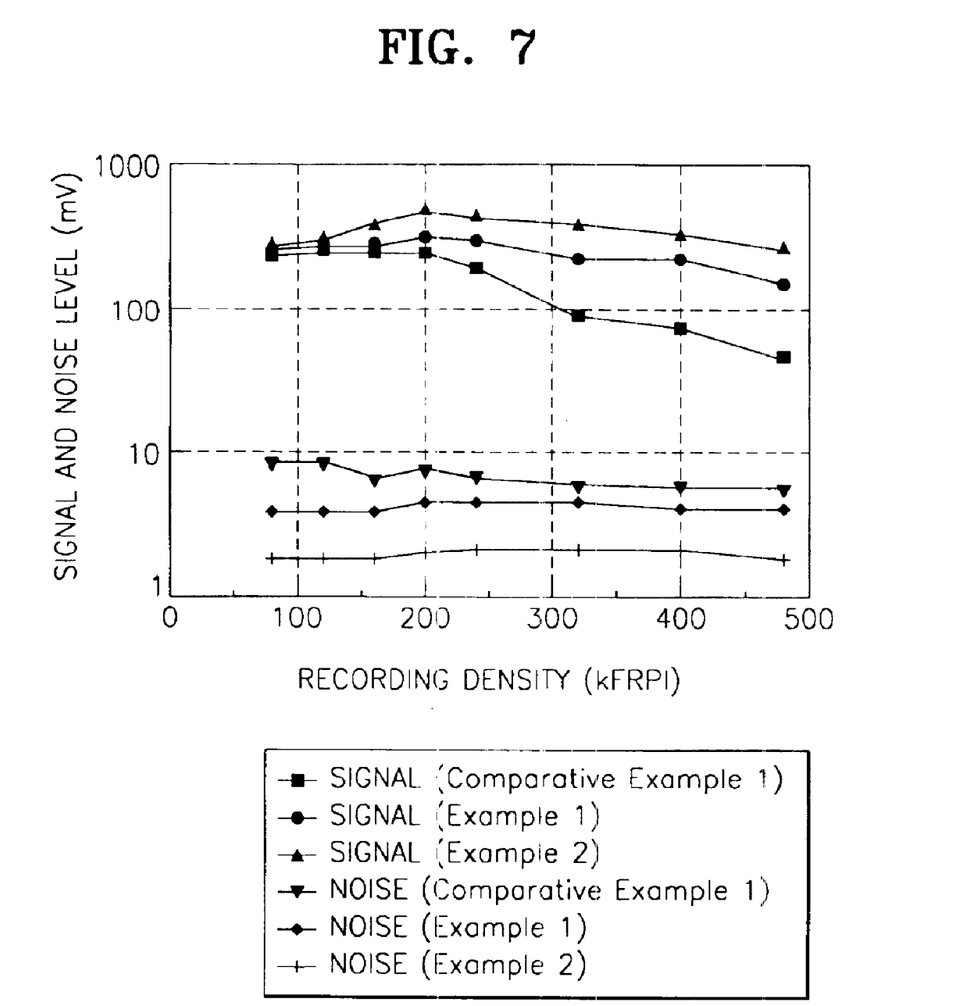
FIG. 7 is a graph showing variations in signal and noise levels with respect to recording densities in fFRPI for single-layer PMR disks manufactured in Examples 1 and 2 and Comparative Example 1.

FIG. 7 shows variations in signal and noise levels with respect to recording densities in kFRPI for the single-layer PMR disks manufactured in Examples 1 and 2 and Comparative Example 1. As shown in FIG. 7, the signal level increases with reduced thickness of the PMR layer due to increase in perpendicular magnetic field gradient. Also, the noise level is markedly decreased due to formation of micro-domains.

Figure 8:
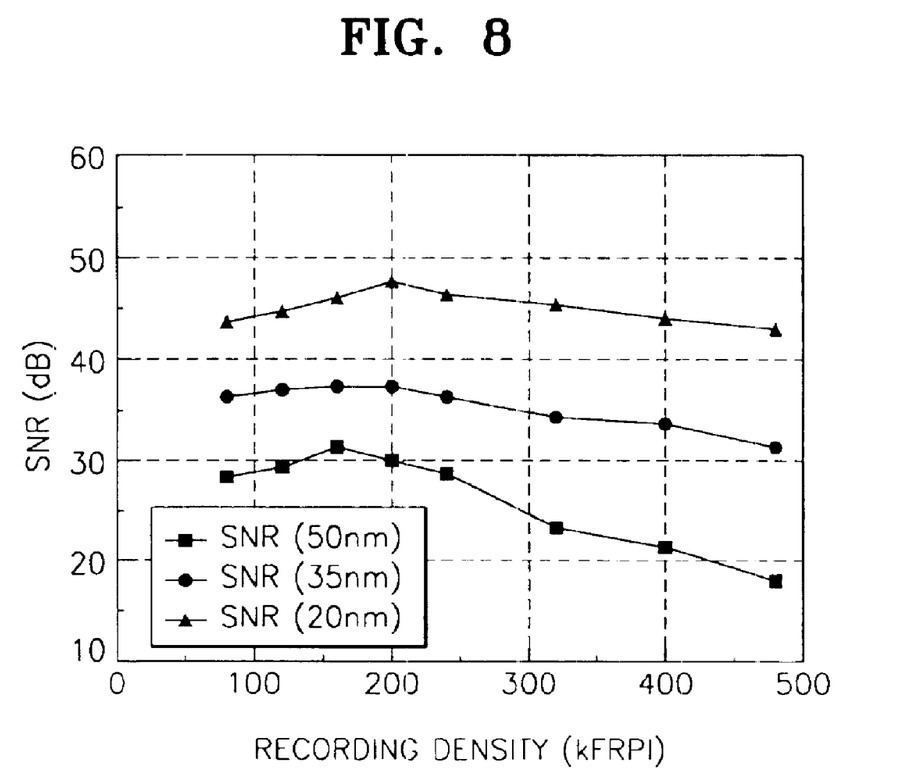
FIG. 8 is a graph showing variations in signal-to-noise ratio (SNR) with respect to recording densities in kFRPI for the single-layer PMR disks manufactured in Examples 1 and 2 and Comparative Example 1.

FIG. 8 shows variations in SNR with respect to recording densities in kFRPI for the single-layer PMR disks manufactured in Examples 1 and 2 and Comparative Example 1. As shown in FIG. 8, the SNR improves with reduced thickness of the PMR layer, due to the increase in signal level and decrease in noise level as described in associated with FIG. 7.

Figure 9:
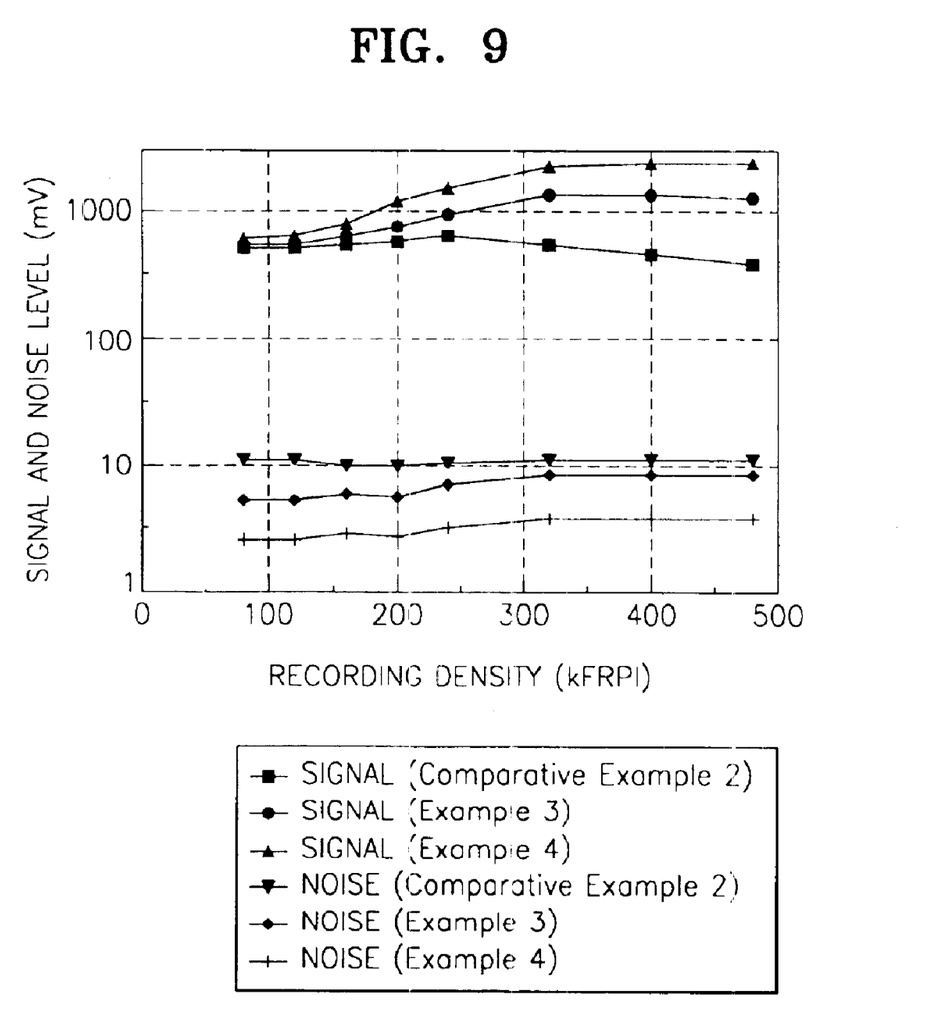
FIG. 9 is a graph showing variations in signal and noise levels with respect to recording densities in kFRPI for pseudo double-layer PMR disks manufactured in Examples 3 and 4 and Comparative Example 2.

FIG. 9 shows variations in signal and noise levels with respect to recording densities in kFRPI for the pseudo double-layer PMR disks manufactured in Examples 3 and 4 and Comparative Example 2. As shown in FIG. 9, the signal level increases with reduced thickness of the PMR layer, due to increase in perpendicular magnetic field gradient and due to the reduction of demagnetisation by formation of the soft magnetic layer. Also, the noise level is markedly decreased due to formation of micro-domains.

Figure 10:
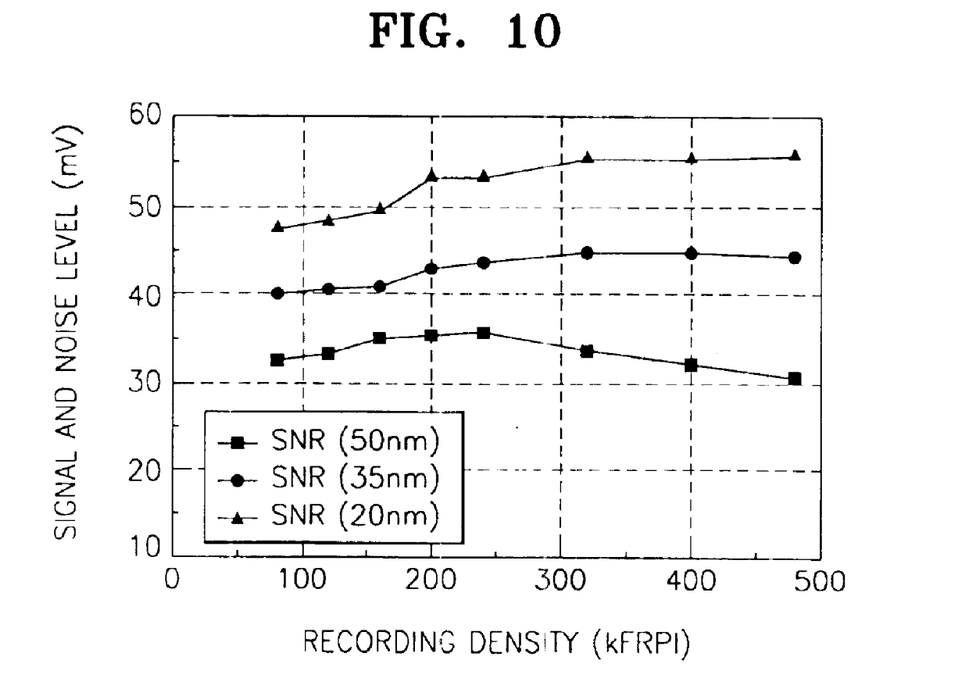
FIG. 10 is a graph showing variations in SNR with respect to recording densities in kFRPI for the pseudo double-layer PMR disks manufactured in Examples 3 and 4 and Comparative Example 2.

FIG. 10 shows the variations in SNR with respect to recording densities in kFRPI for the pseudo double-layer PMR disks manufactured in Examples 3 and 4 and Comparative Example 2. As shown in FIG. 10, the SNR improves with reduced thickness of the PMR layer, due to the increase in signal level and decrease in noise level as described in associated with FIG. 9.

Figure 11:
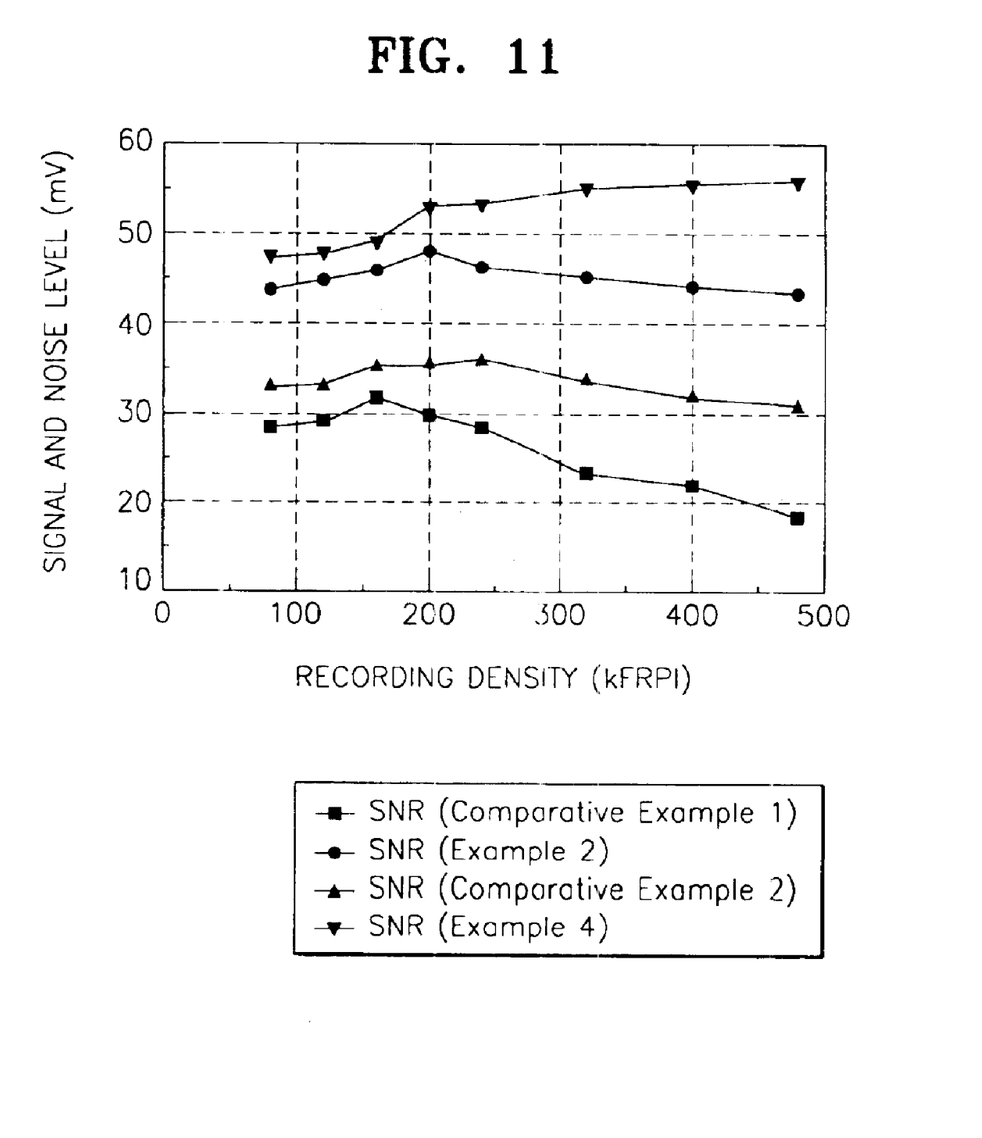
FIG. 11 comparatively shows variations in SNR with respect to recording densities in kFRPI for the PMR disks manufactured in Comparative Examples 1 and 2 and Examples 2 and 4.

FIG. 11 comparatively shows the variations in SNR with respect to recording densities in kFRPI for the conventional single-layer and pseudo double layer PMR disks having a 50 nm-thick CoCr alloy magnetic recording layer and for the single-layer and pseudo layer PMR disks having a 20-nm-thick CoCr alloy magnetic recording layer according to the present invention. A great improvement in SNR is observed for the pseudo double layer PMR disk according to the present invention having a magnetic recording layer as thin as 20 nm with micro-domains.

As described above, in a PMR disk according to the present invention, micro-domains are formed in a magnetic recording layer based on the relation between the magnetostatic energy and domain wall energy of the PMR layer. The PMR layer with micro-domains is applied to a single-layer PMR disk or a pseudo double-layer PMR disk with closed magnetic loops, thereby reducing noise level and improving SNR.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A perpendicular magnetic recording disk including an underlayer of Ti between a substrate and a perpendicular magnetic recording layer of CoCr alloy for inducing perpendicular orientation of the perpendicular magnetic recording layer, and an intermediate soft magnetic layer of NiFe between the underlayer and the perpendicular magnetic recording layer for forming closed magnetic loops together with the perpendicular magnetic recording layer, the perpendicular magnetic recording layer having a thickness in the range of 20–5 nm where the ratio of perpendicular coercivity Hc to maximum perpendicular coercivity Ho decreases with reduced thickness of the perpendicular magnetic recording layer.

2. The perpendicular magnetic recording disk of claim 1, wherein, in the range of thickness of the perpendicular magnetic recording layer, the rate of variation of the ratio of perpendicular remanent magnetization of maximum perpendicular remanent magnetization is greater than of the ratio of perpendicular coercivity Hc to maximum perpendicular coercivity Ho.

3. The perpendicular magnetic recording disk of claim 1, wherein, in the range of thickness of the perpendicular magnetic recording layer, a noise level constant of proportionality a expressed as the following formula decreases with reduced thickness of the perpendicular magnetic recording layer:

$$\alpha = \frac{4\pi Mr}{Hc}$$

where Mr is the perpendicular remanent magnetization and Hc is the perpendicular coercivity.

4. The perpendicular magnetic recording disk of claim 1, wherein the perpendicular magnetic recording layer further comprises at least one material selected from the group consisting of B, Pt, Ta, V, Nb, Zr, Y, and Mo.

5. A perpendicular magnetic recording disk including an underlayer of Ti between a substrate and a perpendicular magnetic recording layer for inducing perpendicular orientation of the perpendicular magnetic recording layer, and an intermediate soft magnetic layer of NiFe between the underlayer and the perpendicular magnetic recording layer for forming closed magnetic loops together with the perpendicular magnetic recording layer, the perpendicular magnetic recording layer having a thickness in the range where the ratio of perpendicular coercivity Hc to maximum perpendicular coercivity Ho decreases with reduced thickness of the perpendicular magnetic recording layer;

wherein the perpendicular magnetic recording layer is formed of a CoCr alloy including at least one material selected from the group consisting of B, Pt, Ta, V, Nb, Zr, Y, and Mo and has a thickness of 20–50 nm.

6. The perpendicular magnetic recording disk of claim 1, wherein the intermediate soft magnetic layer further comprises at least one material selected from the group consisting of Nb, V, Ta, Zr, Hf, Ti, B, Si, and P.

7. The perpendicular magnetic recording disk of claim 6, wherein the intermediate soft magnetic layer has a thickness of 3–30 nm.

8. The perpendicular magnetic recording disk of claim 1, further comprising a protective layer and a lubricant layer sequentially on the perpendicular magnetic recording layer.

* * * * *